United States Patent [19]

Elkind et al.

[11] Patent Number: 6,134,829
[45] Date of Patent: Oct. 24, 2000

[54] SYNCHRONOUS RIPENING OF TOMATOES

[75] Inventors: Yonatan Elkind, Rehovot; Ben-Zion Zaidman, Nazaret Ilit, both of Israel

[73] Assignee: YISSUM Research Development Company of The Hebrew University of Jerusalem, Jerusalem, Israel

[21] Appl. No.: 08/765,785
[22] PCT Filed: Mar. 6, 1995
[86] PCT No.: PCT/EP95/00824
 § 371 Date: Jan. 15, 1997
 § 102(e) Date: Jan. 15, 1997
[87] PCT Pub. No.: WO95/24116
 PCT Pub. Date: Sep. 14, 1995

[30] Foreign Application Priority Data

Mar. 9, 1994 [IL] Israel ....................................... 108.911

[51] Int. Cl.[7] ................ A01G 1/00; A01G 7/00
[52] U.S. Cl. .......................... 47/58.1; 800/260; 800/271; 800/274; 504/116
[58] Field of Search ................... 47/58, DIG. 1, 47/DIG. 9, 58.1; 800/200, DIG. 44, 260, 271, 274; 504/116

[56] References Cited

PUBLICATIONS

Casas Diaz et al. Effects of parthenocarpy on fruit quality in tomato. Journal of the American Society of Horticultural Science, 112:634–637, 1987.

Lipari et al. Parthenocarpy and auxinic treatments in fruiting of tomato in a cold greenhouse. Acta Horticulturae, 229:307–312, 1988.

Tigchelaar. Tomato breeding, In: Breeding Vegetable Crops, Mark Bassett, Ed. The Avi Publishing Co., Connecticut, 1986.

*Primary Examiner*—Gary Benzion
*Assistant Examiner*—Melissa L. Kimball
*Attorney, Agent, or Firm*—Evenson, McKeown, Edwards & Lenahan, P.L.L.C.

[57] ABSTRACT

A method of cultivation of tomatoes resulting in the essentially simultaneous ripening of the entire crop, enabling "one time over" harvesting, saving time and manpower. Sterile tomato plants are cultivated, parthenocarpy is induced by application of a growth regulator. Suitable substances resulting in parthenocarpic fruit set are auxins are auxin transport inhibitors.

7 Claims, 4 Drawing Sheets

SYNCHRONOUS RIPENING OF TOMATOES

FIELD OF THE INVENTION

There is provided a method for inducing essentially simultaneous ripening of tomato, thus facilitating "once go-over" harvesting, which saves manpower and costs. The basis is the use of certain sterile tomato genotypes, which are treated at a suitable period of time with a growth inducing substance which results in parthenocarpic fruit set. Amongst suitable substances are auxins or auxin transport inhibitors.

BACKGROUND OF THE INVENTION

Tomato fruit harvest with manual labor is a costly process. Synchronized vine ripening of tomato fruits allows either mechanical harvest or once over manual harvest which is much more cost effective. Even with varieties having a determinate growth habit the duration of flowering and fruit set ranges between 3 to 6 weeks and this reflects on the duration of fruit ripening. With tomatoes, mechanical harvesting of ripe fruit is possible only in the spring summer-season, in which the ripening period is shorter than the flowering one due to a continuous rise in temperature. But even in this case some fruit stay ripe on the vine for a few weeks, which results in poor quality.

Nowadays, methods of concentrating yield within a rather short period of time are based on cultivation of certain genotypes in certain seasons, usually planting in spring and summer. Although this method provides satisfactory results, it is restricted to certain seasons of the year.

SUMMARY OF THE INVENTION

Figure 1A:
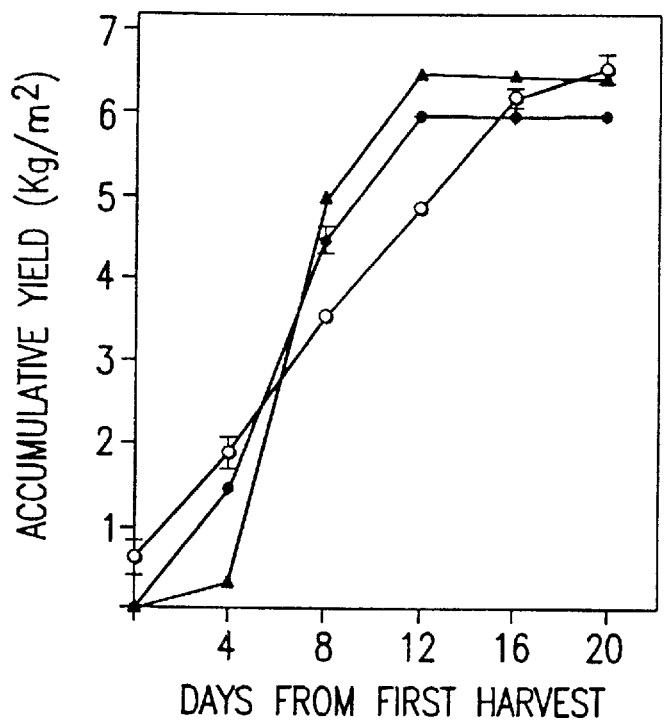
FIG. 1: Accumulation of harvest of Line 599(A) and 606(B) of series C, and of Line 599(C) and (D), series D. Fertile Plants (A,C), infertile ones (B,D) of the two lines were sprayed by N-m-tolylphtalamic acid of 0.6% at the 7 to 9 trusses stage. Fertile plots not sprayed of the two lines are marked (o). Standard deviation is marked, and if smaller than the marker, not marked.

According to the present invention there is provided a method according to which tomatoes are cultivated in such a manner that they ripen on the vine within a short period of time, and can be harvested by a "once over" hand picking or by mechanical harvesting.

In tomatoes there are known a large number of recessive genes which cause male sterility by disrupting the first meiosos at the metaphase stage.

Some male sterility genes in tomato, including ms 10/35 are used for hybrid seed production. A seedling marker gene, anthocyanin absent which is closely linked to ms 10/35 (1.7±1.1 centi morgan) can be used to increase to 96–98% the number of sterile plants in segregating populations (Philouze J. (1974) Ann Amilior Plant 24: 77–82).

Parthenocarpy was termed by Noll (1902), for the development of fruit without seeds in the absence of functional pollen. In tomato, genetically controlled parthenocarpy was associated with increased levels of auxin, at anthesis with a maximum two day after anthesis, while in normal pollinated developing ovary the maximum is at the eighth day (Mapelli et al 1978, Sjut and Bangerth, 1981). Application of various auxin-like compounds has led to parthenocarpy and improved fruit set and increase in fruit size. Under adverse climatical conditions, in particular at high and low temperatures, which disrupt pollen production and pollination, application of growth substances was used to induce parthenocarpy. Two groups of synthetic auxines, derivatives of naphthalenic acid and of chlorophenoxy acid are used. Another group of derivatives of phtalamic acids, which inhibit auxin transport, are also used to induce parthenocarpy. The application is either by spraying the flower truss or by whole plant application, with the former method being mostly used in tomato green house production at low temperatures.

The present invention relates to a novel cultivation method that results in synchronized ripening of tomatoes. A male sterile tomato plant population is planted and when a sufficient available number of flowers are present, parthenocarpy will be induced by application of a suitable growth regulator. The improved yield concentration results from a shorter period of fruit set, within a few days after application.

Induction of parthenocarpy and creation of a sterile plant population via selection marker are both techniques that have been in practical use for a long time, but have never been combined for the intended novel results.

The objective of the invention is to establish the feasability of achieving synchronized ripening of tomatoes by induction of parthenocarpy on male sterile plants and to determine the effect of growth regulator application time and dose on ripe fruit yield concentration in sterile and fertile genotypes.

According to the present invention there are cultivated certain selected genotypes of tomato, which are subjected to a treatment as set out in the following, the result being an essentially simultaneous ripening of the tomatoes on the vine, enabling simultaneous harvesting of the entire crop.

There are cultivated male sterile tomato plants, such as a genotype having an aa, a hypoctyle marker gene linked to the gene ms 10–35 male sterility gene and applying to these at a certain stage a growth regulating compound, such as an auxin, or an auxin transport inhibitor. Suitable substances are the well known ones Tomaset (N-meta-tolyl-phthalamic acid) or 4-CPA, respectively. Such application results in a start of fruit development within a small number of days, such as about 6 days from such application, resulting in an essentially simultaneous ripening.

The invention is described by way of example with reference to the following description, which is by way of illustration only.

Breeding lines numbered 599 and 606, $BC_5$ to the male sterile gene ms 10/35 linked to the seedling marker anthocyanin-absent aa were used. The seeds of breeding lines 599 and 606 are deposited in the International Depository at the American Type Culture Collection (ATCC), Manassas, Va., 20110-2209 U.S.A. on Mar. 21, 2000 under deposit designation number PTA-1613 and PTA-1614, respectively. The deposit was made under the Budapest Treaty on the International Recognition of the Deposit of Microorganisms for the Purposes of Patent Procedure. The deposit will be unconditionally available to the public upon grant of a Patent issued from this application, and the deposit will be maintained in the depository for 30 years or 5 years after the last request for a sample or for the enforceable life of the patent. Seeds of selfed heterozygote plants, or seeds from crossing sterile plants with heterozygotes were used. Male sterile and fertile populations were obtained by seeding any excess amount of seeds of populations segregating for ms 10/35 and aa. Two weeks after seeding seedlings were sorted into green and purple hypocotyls, providing sterile and fertile isogenic lines, respectively.

The soil was treated by 50 grams/m$^2$ of methyl-bromide. One month old seedlings were planted in rows, 1.6 m between rows and spaced 0.5 m within rows in a stand of 1.25 per m$^2$. Rows were mulched with a yellow polyethylene sheet for help in the control TYLCV transmitted by Bemisia tabbaci. Irrigation and fertilization was made by a drip system according to evaporation rate and plant development, similar to commercial practices.

Each plot of 8 m$^2$ consisted of ten plants. Either fertile or sterile plants were planted in each plot, which were treated with a growth regulator. A randomized block design was used. The same set of experiments was performed in two planting dates April 1, and May 10, 1993.

In the feasability experiment 0 and 0.6% N-m-tolyphtalamic acid (NTPA, commercial name "Tomaset") were applied by Echo Shr 200 at 50 ml/m$^2$ to plants at 7–9 flower trusses. In the dose experiment 0, 0.4%, 0.6%, 0.8% and 1.0% of NTPA was applied to plants at 7–9 flower trusses. In the application timing experiment 0.6% NTPA was applied at 3–5, 7–9 and 10–12 trusses per plant.

Harvest

Pink and red ripe fruits were hand harvested from each plot twice a week and weighed and considered as ripe yield.

Data analysis

Data analysis was made with the SAS (1990) on VAX 4000. Total yield and the mean and standard deviation of yield distribution along time scale were used to characterize the dispersal of the ripe fruit during the harvest period. Total plot yield (TY,kg/m$_2$), and yield dispersal (YD, day) were calculated as follows:

$$TY = \Sigma Yi \quad (1)$$

where Yi is the yield in kg/m$_2$ in the ith harvest. The average day of harvest D. was calculated:

$$D. = \Sigma Di * Yi/TY \quad (2)$$

where Di is the days from the beginning of the harvest of the ith harvest.

$$YD = \sqrt{\Sigma (Di=D.)^2 * Yi/TY} \quad (3)$$

The above values for each plot were used for the statistical analysis.

Application of NTPA induced parthenocarpy in tomato male sterile plants. Total tomato yield was similar or greater in sterile plants treated with NTPA when compared to fertile untreated plants from both lines (Table 1). Non-treated male sterile plants gave no yield, and therefore were excluded from the analysis of variance. Application of NTPA to fertile plants interacted with the line for TY. In line 606 it caused an about 25% increase in TY while in line 599 it caused 10% to 15% reduction. YD was pronouncedly reduced in sprayed sterile plants when compared to fertile not sprayed ones. The most striking effect was observed in line 599 in the first planting date, in which YD was reduced from 5.49 days to 2.00 days (Table 1). In the least effective example YD was reduced from 4.45 days to 2.77 days.

Figure 1B:
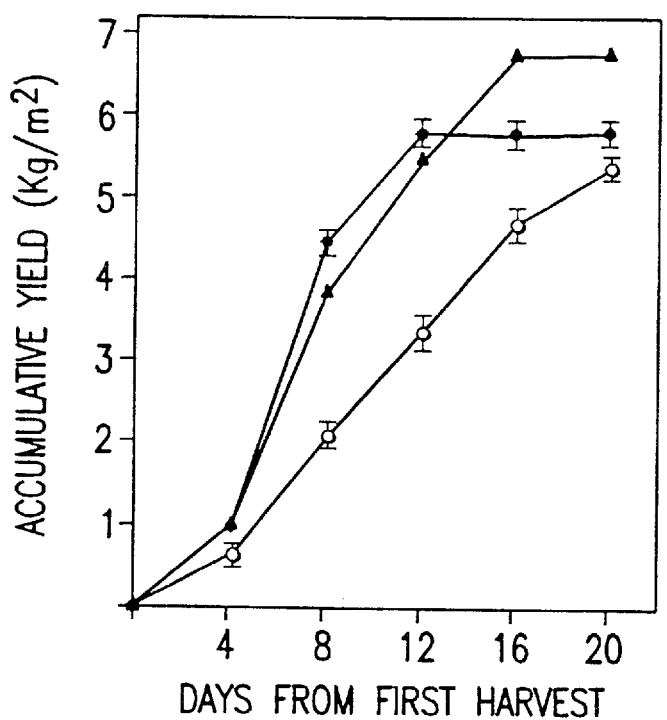
Figure 1C:
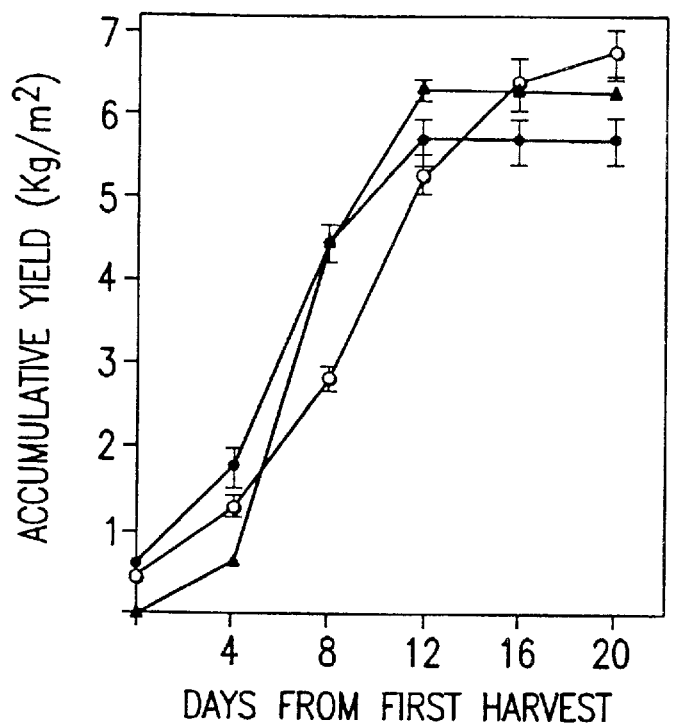
Figure 1D:
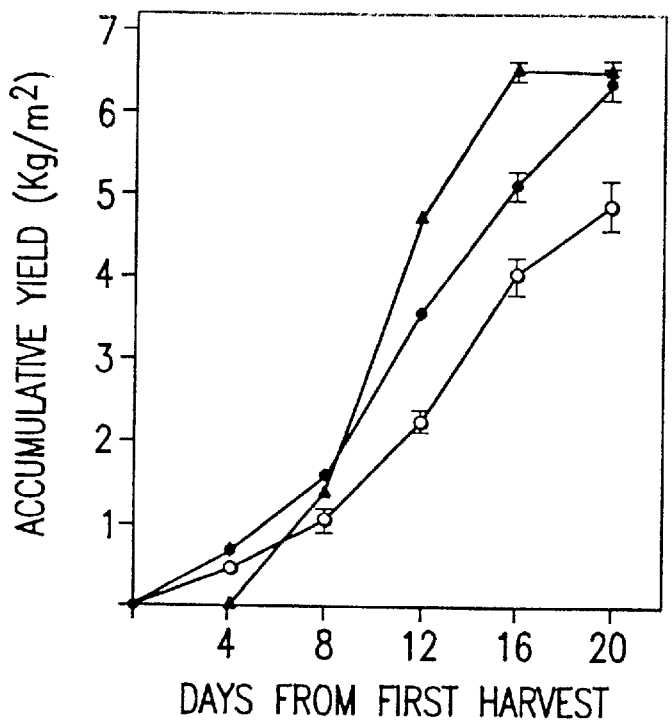

In the sprayed sterile treatment, fruit begin to ripe later than with the other combinations (FIG. 1). The rate of ripe fruit accumulation is higher as a result of the sprayed sterile treatment (FIG. 1). The sprayed fertile line treatment exhibits a higher ripe fruit accumulation than the fertile one without spray, but it is not as high as with the sprayed sterile treatment.

Figure 2A:
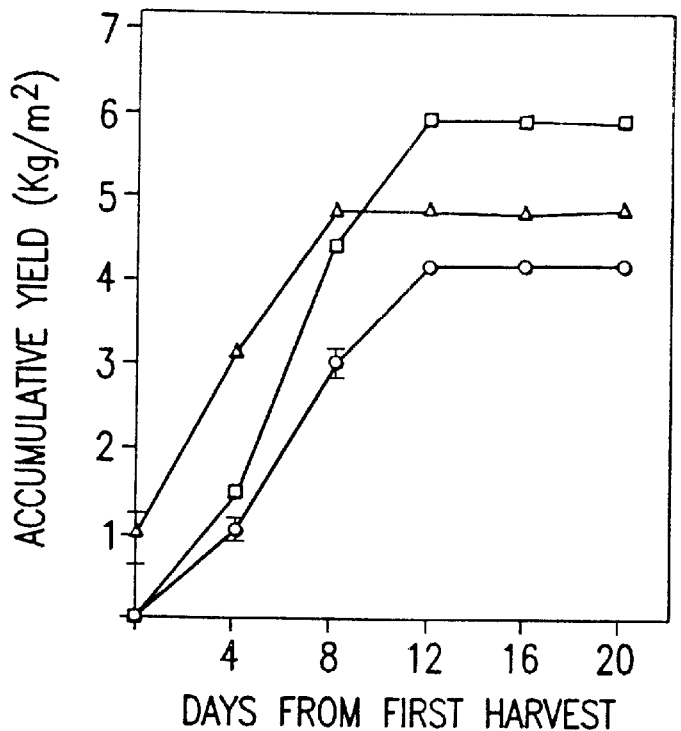
FIG. 2: Accumulation of harvest of lines 599(A,B) and 606(C,D), which were planted in Series 3. Fertile plots (A,C marked with empty signs), and infertile plots (B,D, full signs), of the two lines were sprayed with 0.6% N-m-tolylphtalamic acid of 3 to 5, 7 to 9 and 10 to 12 trusses. Standard deviation is marked on the signs.
Figure 2B:
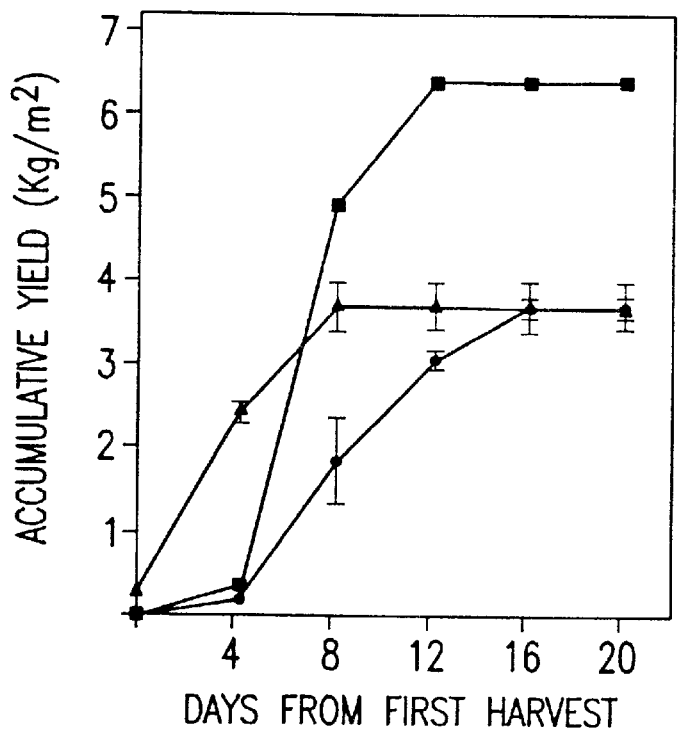
Figure 2C:
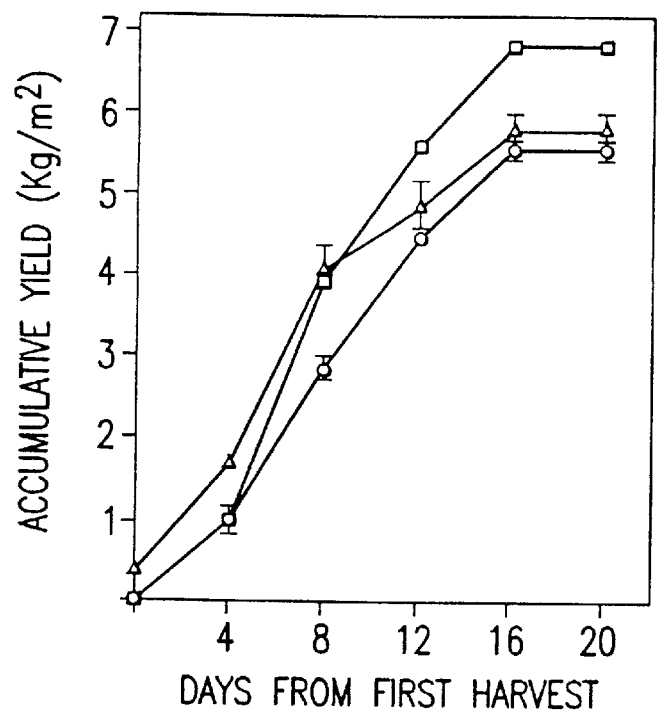
Figure 2D:
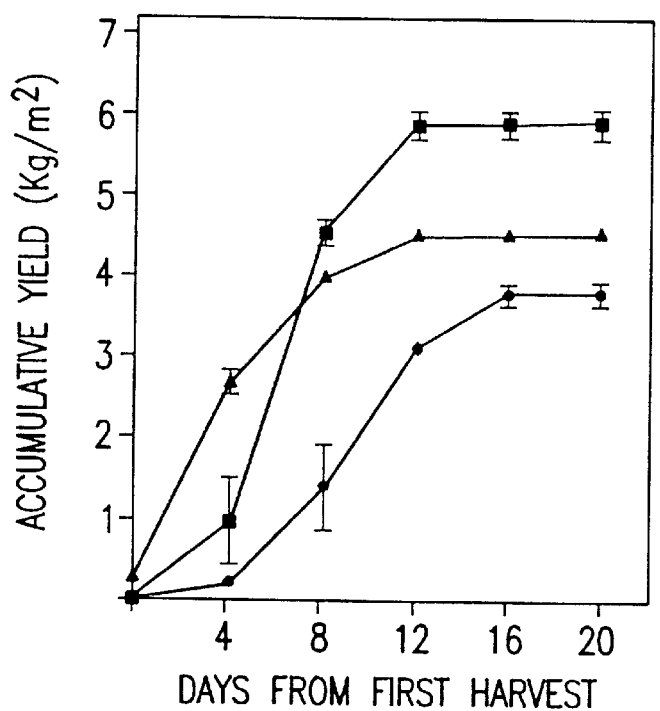

NTPA was applied at three phenological stages, namely 3–5, 7–9 and 10–12 trusses per plant. Application of 0.6% NTPA at 7–9 trusses gave both high TY and lowest YD for both sterile and fertile genotypes in both lines, Table 2. Application stage had the greatest effect of TY of sterile plants of line 599, followed by the sterile of line 606. Onset of ripe yield accumulation corresponded to application time. Early application (3–5 trusses) resulted in earlier ripening (FIG. 2). The low YD of application at 7–9 trusses is also evident at a higher yield accumulation rate (FIG. 2).

NTPA was applied at 5 concentrations, namely: 0, 0.4, 0.8 and 1%.

In both experiments maximum TY was obtained at 0.6 and 0.8% for sterile plants. But, using 0.8% NTPA gave about 50% increase in YD compared to 0.6% in both experiments Table 3. Therefore, it is clear that,at this experiment 250.6% is the optimal dose, as it gives the best combination of high yield and the lowest YD. Similar trend but not as pronounced can be seen in the fertile plants, Table 3.

What is claimed is:

1. A method for cultivation of tomatoes resulting in essentially simultaneous ripening of the tomatoes, facilitating once over manual or mechanical harvesting, which comprises:

cultivating male sterile tomato plants, said male sterile plants being from lines 599MSA and 606MSA, the seeds of said lines are deposited at the ATCC under deposit designation number PTA-1613 and PTA-1614, respectively, said lines have a male sterile gene ms 10/35 linked with the marker gene anthocyanin absent (aa) said marker gene allowing phenotypic selection, identifying and eliminating any cultivated male fertile plants through said phenotypic selection, inducing parthenocarpy in said male sterile plants at a defined stage of development by application of a growth regulator or auxin transport inhibitor resulting in a quantitative yield dispersal of about 2 to about 3 days.

2. The method according to claim 1, where N-m-tolyphthalamic acid is applied at the 7 to 9 flower trusses per plant stage at a predetermined rate.

3. The method according to claim 2, where about 0.1–1.5 preferably 0.3–0.8% of N-m-tolyphtalamic acid is applied at the 5 to 13 preferably 6 to 11 trusses per plant stage.

4. A process according to claim 1, where a growth regulator is applied at a predetermined stage of the development of the tomato plant, inducing parthenocarpy.

5. A method according to claim 1, where an auxin transport inhibitor is applied to the tomato plant at a given development stage to induce parthenocarpy.

6. A method for improving yield concentration of tomatoes, comprising:

cultivating male sterile tomato plants, said male sterile plants being from lines 599MSA and 606MSA, the seeds of said lines are deposited at the ATCC under deposit designation number PTA-1613 and PTA-1614, respectively, said lines have a male sterile gene ms 10/35 linked with the marker gene anthocyanin absent (aa) said marker gene allowing phenotypic selection, identifying and eliminating any cultivated male fertile plants through said phenotypic selection, inducing parthenocarpy in said male sterile plants at a defined stage of development by application of a growth regulator or auxin transport inhibitor, whereby the yield concentration of tomatoes is improved.

7. A method for shortening a period for development of fruit set of tomatoes, comprising:

cultivating male sterile tomato plants, said male sterile plants being from lines 599MSA and 606MSA, the seeds of said lines are deposited at the ATCC under deposit designation number PTA-1613 and PTA-1614, respectively, said lines have a male sterile gene ms 10/35 linked with the marker gene anthocyanin absent (aa) said marker gene allowing phenotypic selection, identifying and eliminating any cultivated male fertile plants through said phenotpic selection, inducing parthenocarpy in said male sterile plants at a defined stage of development by application of a growth regulator or auxin transport inhibitor, whereby the period for development of fruit set of tomatoes is shortened.

* * * * *